Dec. 29, 1964    P. HOHNSTEIN    3,163,296
COLLAPSIBLE RACK
Filed June 4, 1963    2 Sheets-Sheet 1
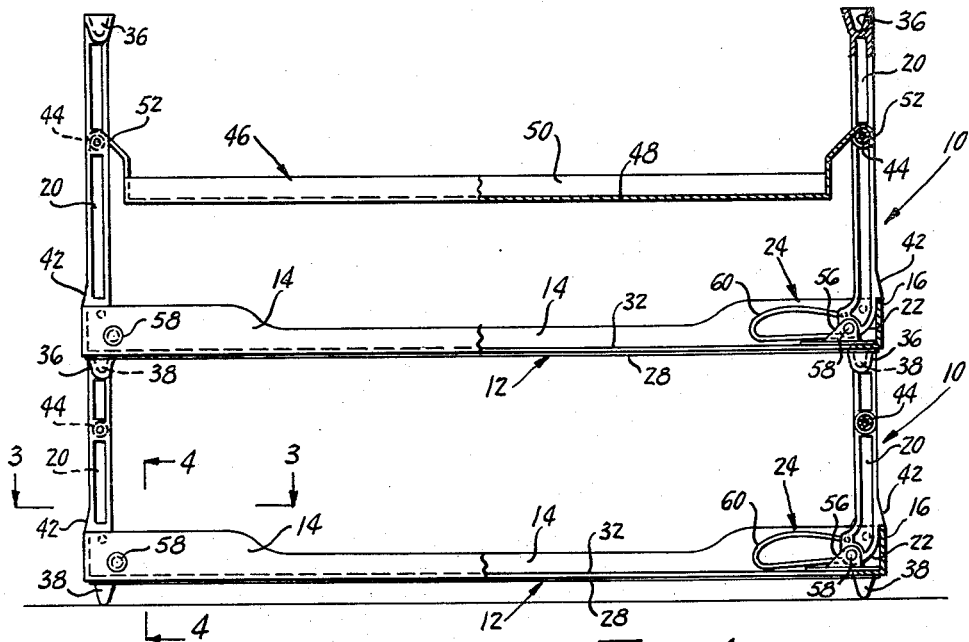
FIG. 1
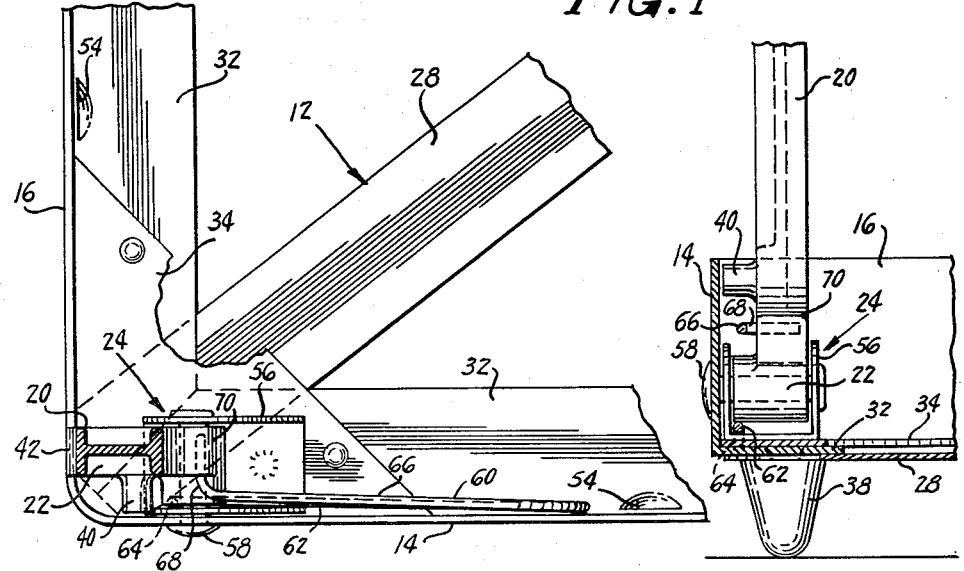
FIG. 3
FIG. 4
INVENTOR.
PAUL HOHNSTEIN
BY Kimmel & Crowell
ATTORNEYS.

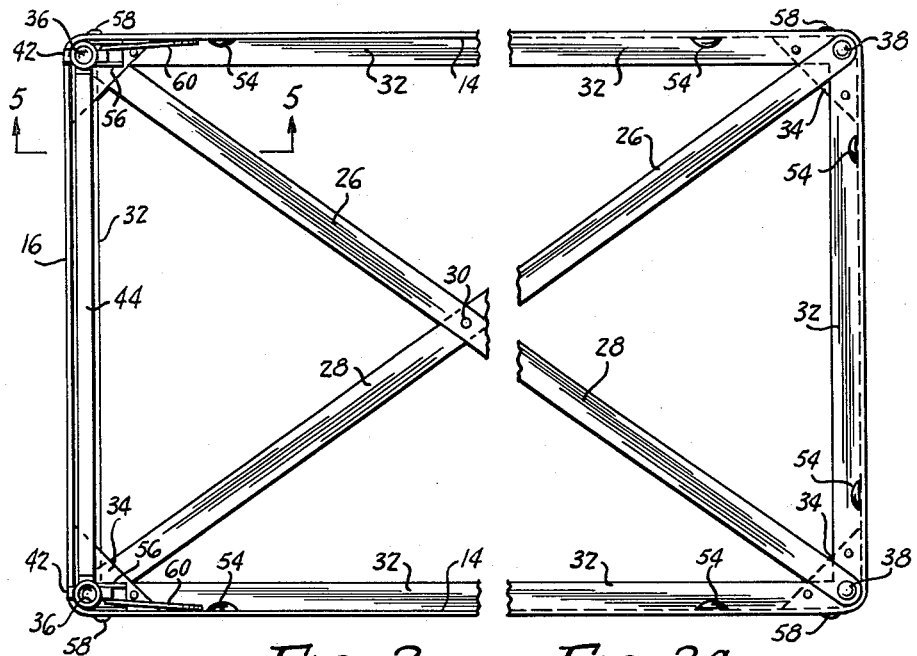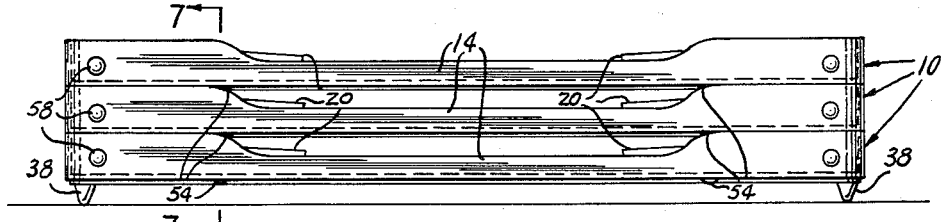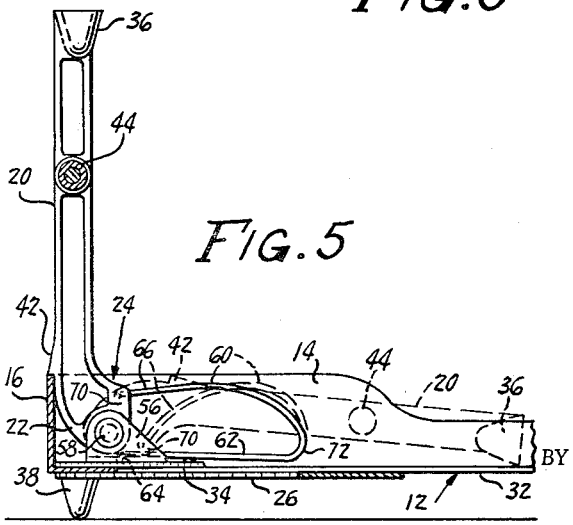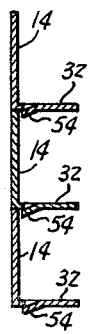

United States Patent Office 3,163,296
Patented Dec. 29, 1964

3,163,296
COLLAPSIBLE RACK
Paul Hohnstein, 1014 E. 3rd St., Hastings, Nebr.
Filed June 4, 1963, Ser. No. 285,434
7 Claims. (Cl. 211—126)

This invention relates to a collapsible rack or tray and has particular adaptability for the handling of bakery products, such as loaves of bread, rolls, or similar articles.

A primary object of this invention is the provision of a rack of the character described which is provided at each of its corners with a hinged leg movable between an opened position wherein the leg is disposed substantially perpendicularly to the tray portion of the rack and a collapsed position wherein the leg is disposed within peripheral walls surrounding the tray portion and substantially parallel to the tray portion.

Another object of this invention is to provide such a rack having means to facilitate stacking a plurality of the same when the legs are extended to their opened relationship.

A further object of the instant invention is the provision of such a rack having means to facilitate stacking a plurality of the same when the legs are folded to their collapsed relationship.

A still further object of this invention is to provide a transversely extending rod or bar between each end pair of legs to act as a handle or carrier member and simultaneously to carry auxiliary trays intermediate the upper and lower ends of the legs to increase the capacity of each rack.

Still another object of this invention is the provision of a rack of the type described wherein the hinge means pivotally mounting each of the legs includes a snap-over-center spring means normally biasing the legs away from a position intermediate the opened and collapsed relationships to facilitate readying the rack for use or storage.

A still further object of this invention is to provide a rack with legs hingedly supported by means tending to maintain the same either opened or collapsed after they have been manually moved to either of these relationships.

Yet another object of the instant invention is the provision of a rack of the type described which is sturdy and durable in construction, efficient and reliable in use, and relatively simple and inexpensive to manufacture, assemble, utilize, and maintain.

Other and further objects reside in the combinations of elements, arrangements of parts, and features of construction.

Still other objects will in part be obvious and in part be pointed out as the description of the invention proceeds and as shown in the accompanying drawings wherein:

FIGURE 1 is a side elevational view of two racks in accordance with the instant invention stacked, one upon the other, in their opened relationship, showing an auxiliary tray carried by the upper rack, with parts in section for illustrative clarity;

FIGURE 2 is a fragmentary top plan view of one of the racks of the instant invention;

FIGURE 2a is a fragmentary bottom plan view of the rack;

FIGURE 3 is an enlarged fragmentary cross-sectional view taken substantially on line 3—3 of FIGURE 1;

FIGURE 4 is an enlarged fragmentary vertical cross-sectional view taken substantially on line 4—4 of FIGURE 1;

FIGURE 5 is an enlarged fragmentary transverse cross-sectional view taken substantially on line 5—5 of FIGURE 2;

FIGURE 6 is a side elevational view of a plurality of racks in accordance with the instant invention stacked, one upon the other, in their collapsed relationship; and FIGURE 7 is an enlarged fragmentary cross-sectional view taken substantially on line 7—7 of FIGURE 6.

Similar reference characters refer to similar parts throughout the several views of the drawings.

Referring now to the drawings in detail, the collapsible rack of the instant invention is designated generally by the reference numeral 10, two such racks being shown as stacked in opened relationship in FIGURE 1, and three such racks being shown as stacked in closed relationship in FIGURE 6. Each rack 10 comprises basically a substantially rectangular tray 12 having upstanding peripheral side and end walls 14 and 16, respectively, carriers disposed substantially parallel to each of the end walls 16 and including a pair of legs 20 each hingedly secured at their lower ends 22 to the tray 12 by hinge means 24 and movable between the opened relationship shown in FIGURE 1 and in full lines in FIGURE 5 wherein each of the legs 20 is disposed substantially perpendicularly to the tray 12 and the collapsed relationship shown in FIGURE 6 and in dotted lines in FIGURE 5 wherein each of the legs 20 is disposed inwardly of the peripheral side walls 14 and substantially parallel to the tray 12. The rack 10 may be made of any conventional material, aluminum or steel being preferred, and in any desired dimensions.

The tray 12 may be formed solid or perforated, if desired, but in the embodiment shown, is defined by a pair of crossed strap elements 26 and 28 secured to each other at their center 30 in any conventional manner and secured at their ends to peripheral side members 32 in any conventional manner, gussets or braces 34 being provided to increase the strength of the joints.

Each leg 20 is shown as extruded or formed in a double channel or I configuration over the majority of its length. Socket members 36 formed of any material, nylon or the like being preferable, are provided adjacent the upper ends of each leg 20 and downwardly extending projections 38 formed of a similar material and dimensioned to be received within the sockets 36 are provided at each corner of the underside of the tray 12. The sockets 36 and projections 38 are shown as substantially conical in form but may be hemispherical or the like to cooperate so that the projections 38 of one rack 10 are received in the socket members 36 of a further rack positioned therebelow when the lower rack has its legs disposed substantially perpendicularly to its tray as shown in FIGURE 1 to thereby facilitate stacking a plurality of racks 10 in their opened relationship and to avoid accidental collapse or upsetting of a stack of racks.

Each leg 20 has an outwardly extending lug member 40 secured adjacent its lower end 22. The lug members 40 slidingly engage the inside of the peripheral side walls 14 to thereby facilitate guiding the legs 20 in their movement between the opened and collapsed relationships.

Each of the legs 20 also has an outstanding stop element 42 defined in spaced relationship to its lower ends 22 and abuttingly engaging the upper edge of the peripheral end walls 16 when the legs 20 are disposed substantially perpendicularly to the tray 12 to limit the movement of the legs 20 in the opened relationship.

A rod or bar member 44 extends transversely between each pair of legs 20 parallel to the peripheral end walls 16 and functions as a handle or carrier member in an obvious manner. Auxiliary tray members 46 have a substantially flat bottom portion 48 and upstanding peripheral walls 50 including means 52 defining hanger members at each end of the auxiliary tray 46 adapted to be received over the rod members 44 to support the auxiliary tray intermediate the upper and lower ends of the legs 20 a shown in FIGURE 1.

The underside of the tray 12 is provided with a plurality of downwardly extending positioning elements 54 preferably pressed from each of the peripheral side members 32 spaced inwardly from the edges approximately the thickness of the peripheral walls 14 and 16. The positioning elements 54 of one rack 10 engage the inside of the peripheral walls 14 and 16 of another rack 10 positioned therebelow when the lower rack has its legs 20 disposed substantially parallel to its tray 12 to thereby facilitate stacking a plurality of racks 10 in their collapsed relationship. Note particularly FIGURE 6 and 7.

Each of the hinge means 24 includes a bifurcated bracket member 56 secured to each corner of the tray 12, a pin means 58 extending parallel to the end walls 16 and pivotally supporting each of legs 20 adjacent their lower ends 22, and a snap-over-center spring means 60 normally biasing the legs 20 away from a position intermediate the opened and collapsed relationships shown in FIGURES 1 and 6, respectively. Each spring means 60 is substantially U-shaped and includes a lower arm 62 having a free end 64 secured to the tray 12 below the pin means 58, an upper arm 66 having a free end 68 secured to a portion 70 of the legs 20 which is disposed above the pin means 58 when the legs 20 are in their opened relationship and below the pin means 58 when the legs are in their collapsed relationship. The lower and upper arms 62 and 66, respectively, of the spring means 60 are connected at the ends opposite their free ends by a bight portion 72 and the upper arm 66 is flexed as shown in dotted lines in FIGURE 5 as the leg 20 is folded from its opened relationship position to its collapsed relationship position. Since the portion 70 of the leg 22 in which the free end 68 of the upper arm 66 of the spring means 60 is secured is maintained a constant distance from the pin means 58, the upper arm 66 flexes to a position of maximum tension intermediate the opened and collapsed relationships of the legs 20. The tension in the upper arm 66 is reduced when the leg reaches its fully opened relationship and is again reduced as the portion 70 passes below the pin means 58 when the leg 20 is in its fully collapsed relationship. Thus, the tendency is for the legs 20 to remain in either their fully opened or fully collapsed relationship and to be biased towards one of these positions when it is intermediate both of them.

The use and operation of the collapsible rack of the instant invention will now be apparent. A plurality of the racks 10 may be readily stored in their collapsed relationship as shown in FIGURES 6 and 7 by stacking one upon the other so that the positioning elements 54 engage the inside of the peripheral walls 14 and 16 of the next lower rack thereby preventing accidentally knocking one rack off the stack. Since each of the legs 20 are disposed completely within the peripheral walls 14 and 16 in their collapsed relationship, the stacked structure is relatively compact for storage and handling. When it is desired to open a rack the legs 20 are readily moved until they are substantially perpendicularly disposed to the tray 12 by pivoting the same about the pin means 58, the spring means 60 biasing the legs 20 to their fully opened relationship and the stop elements 42 limiting their movement. The racks 10 may be readily carried in their opened relationship by the rod members 44 and auxiliary racks 46 may be supported on the rods 44 as shown in FIGURE 1 if additional storage area is necessary, or if relatively low profile articles are being carried on the trays 12. A plurality of opened racks 10 may be readily stacked, one upon the other, as shown in FIGURE 1, by engaging the projections 38 within the socket members 36 thereby providing a relatively sturdy construction.

It will now be seen that there is herein provided an improved collapsible rack which satisfies all of the objectives of the instant invention and others, including many advantages of great practical utility and commercial importance.

Since many embodiments may be made of the instant inventive concept and since many modifications may be made of the embodiments hereinbefore shown and described, it is to be understood that all matter herein is to be interpreted merely as illustrative, and not in a limiting sense.

I claim:

1. A collapsible rack comprising a substantially rectangular tray having upstanding peripheral side and end walls, carriers disposed substantially parallel to each of said end walls, each carrier including a pair of legs with upper and lower ends, hinge means foldably securing said lower end of each leg adjacent one of the corners of said tray, each of said legs being movable between an opened relationship wherein said leg is disposed substantially perpendicularly to said tray and a collapsed relationship wherein said leg is disposed inwardly of said peripheral walls and substantially parallel to said tray, each of said hinge means including a pin means extending parallel to said end walls and pivotally supporting one of said legs, and a snap-over-center spring means normally biasing said leg away from a position intermediate said opened and collapsed relationships, each of said spring means being substantially U-shaped and having a lower arm, an upper arm, a free end on each of said arms, and a bight portion connecting the other ends of each of said arms, each of said legs having a portion disposed above said pin means when said leg is in said opened relationship and below said pin means when said leg is in said collapsed relationship, the free ends of said lower arms of said spring means being secured to said tray below each of said pin means, and the free ends of said upper arms of said spring means being secured to said last-mentioned portions of said legs, whereby said upper arms of said spring means are flexed to a position of maximum tension when said legs are moved to a position intermediate said opened and collapsed relationships.

2. A structure in accordance with claim 1 wherein said upper end of said legs is provided with a socket member, and the underside of said tray is provided at each corner with a downwardly extending projection dimensioned to be received in the socket members of a rack positioned therebelow when the lower rack has its legs disposed substantially perpendicularly to its tray to thereby facilitate stacking a plurality of said racks in their open relationship.

3. A structure in accordance with claim 1 wherein the underside of said tray is provided with a plurality of downwardly extending positioning elements spaced inwardly from each of its edges approximately the thickness of said peripheral walls, said positioning elements engaging inside of the peripheral walls of a rack positioned therebelow when the lower rack has its legs disposed substantially parallel to its tray to thereby facilitate stacking a plurality of said racks in their collapsed relationship.

4. A structure in accordance with claim 1 wherein each of said carriers further includes a rod member extending transversely between said pair of legs.

5. A structure in accordance with claim 1 further comprising, in combination, a rod member extending transversely between each pair of legs, an auxiliary tray, and means defining a hanger member at each end of said auxiliary tray, said hanger members being received over said rod members to support said auxiliary tray, intermediate said upper and lower ends of said legs.

6. A structure in accordance with claim 1 wherein each of said legs has an outwardly extending rod member adjacent its lower end, said leg member slidably engaging inside of said peripheral side walls to thereby facilitate guiding said legs in their movement between said open and collapsed relationships.

7. A structure in accordance with claim 1 wherein each of said legs has an outstanding stop element defined in spaced relationship to said lower end, said stop elements abuttingly engaging the upper edge of said peripheral end walls when said legs are disposed substantially perpendicularly to said tray to limit the movement of said legs in said opened relationship.

References Cited by the Examiner
UNITED STATES PATENTS

| | | | |
|---|---|---|---|
| 803,102 | 10/05 | Harris | 211—125 |
| 1,300,861 | 4/19 | Otte | 248—439 X |
| 1,709,927 | 4/29 | Whitney | 248—439 X |
| 1,899,423 | 2/33 | Riebel | 267—1 |
| 2,340,540 | 2/44 | Lange | 211—179 X |
| 2,587,233 | 2/52 | Schweller | 220—97 |
| 2,699,911 | 1/55 | Chase | 108—53 |
| 2,747,748 | 5/56 | Barefoot | 211—125 |
| 2,863,568 | 12/58 | Skubic | 108—53 |
| 2,994,463 | 8/61 | Drader | 211—126 X |

CLAUDE A. LE ROY, *Primary Examiner.*

FRANK L. ABBOTT, *Examiner.*